United States Patent [19]

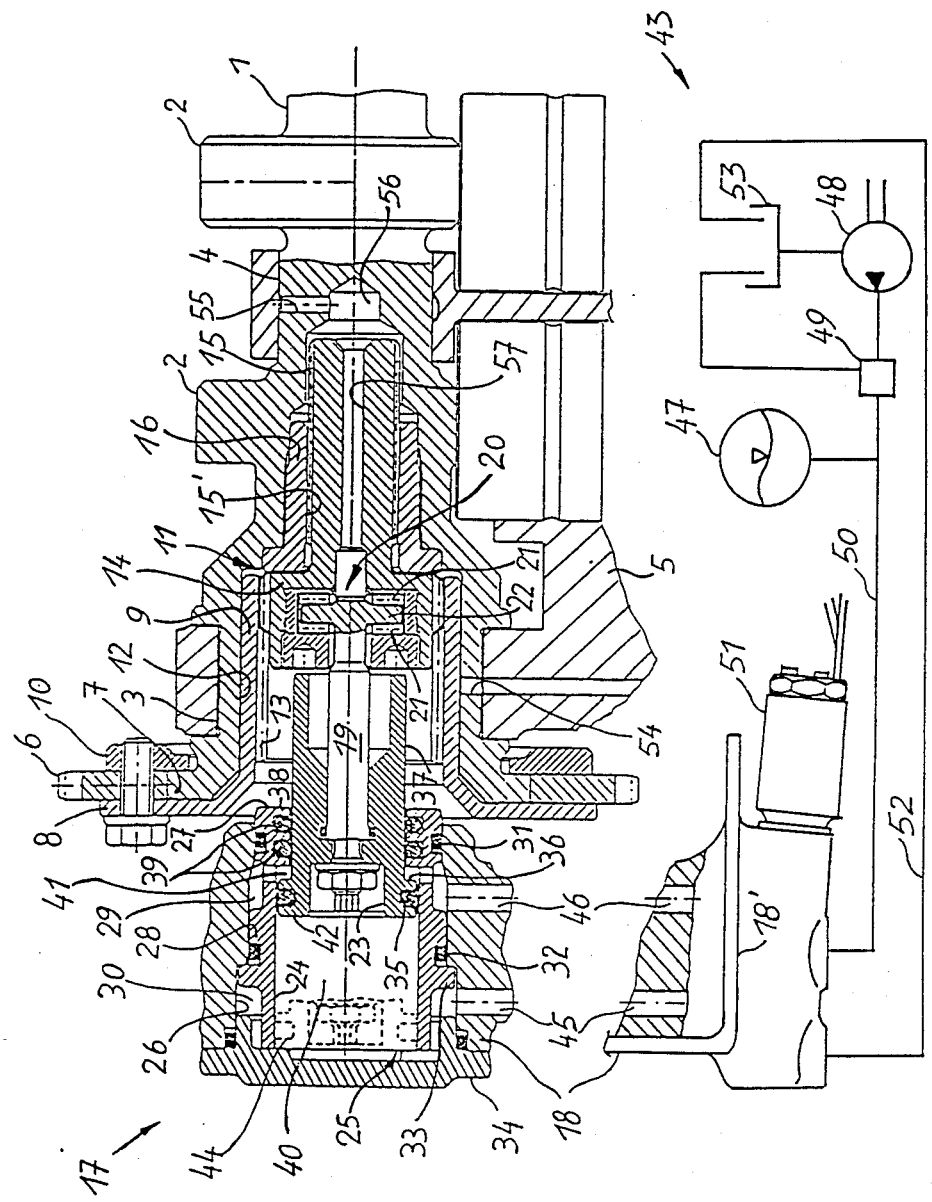

Thoma

[11] Patent Number: 4,787,345

[45] Date of Patent: Nov. 29, 1988

[54] ARRANGEMENT FOR THE RELATIVE ANGULAR POSITION CHANGE OF TWO SHAFTS DRIVINGLY CONNECTED WITH EACH OTHER, ESPECIALLY BETWEEN A CRANKSHAFT SUPPORTED IN AN ENGINE HOUSING OF AN INTERNAL COMBUSTION ENGINE AND A CAM SHAFT

[75] Inventor: Josef Thoma, Munich, Fed. Rep. of Germany

[73] Assignee: Bayerische Motoren Werke A.G., Fed. Rep. of Germany

[21] Appl. No.: 48,817

[22] Filed: May 12, 1987

[30] Foreign Application Priority Data

May 14, 1986 [DE] Fed. Rep. of Germany ....... 3616234

[51] Int. Cl.$^4$ ................................................ F01L 1/34
[52] U.S. Cl. ............................... 123/90.17; 123/90.15; 464/2
[58] Field of Search ............... 123/90.12, 90.15, 90.16, 123/90.18, 502; 464/2

[56] References Cited

U.S. PATENT DOCUMENTS

| 2,191,459 | 2/1940 | Duncan | 123/90.17 |
| 3,258,937 | 7/1966 | Krane et al. | 464/2 |
| 4,231,330 | 11/1980 | Garcea | 123/90.15 |
| 4,494,495 | 1/1985 | Nakamura et al. | 123/90.15 |
| 4,494,496 | 1/1985 | Nakamura et al. | 123/90.15 |
| 4,498,431 | 2/1985 | Nakamura et al. | 123/90.15 |
| 4,561,390 | 12/1985 | Nakamura et al. | 123/90.15 |
| 4,627,825 | 12/1986 | Bruss et al. | 123/90.15 X |

FOREIGN PATENT DOCUMENTS

| 368775 | 2/1923 | Fed. Rep. of Germany . |
| 1916167 | 10/1970 | Fed. Rep. of Germany . |
| 3029858 | 2/1981 | Fed. Rep. of Germany . |
| 128628 | 10/1980 | Japan . |

Primary Examiner—Tony M. Argenbright
Attorney, Agent, or Firm—Barnes & Thornburg

[57] ABSTRACT

In an arrangement for the relative angular position change of two shafts drivingly connected with each other, especially between a crankshaft supported in an engine housing of an internal combustion engine and a cam shaft, the cam shaft is equipped with a driving gear which is angularly movably arranged relative to the cam shaft by way of an axially displaceable coupling member. An actuating mechanism for the axial displacement of the coupling member for an angular position change of the cam shaft relative to the driving gear and therewith to the crankshaft is arranged structurally separate from the cam shaft at a detachable engine housing cover. The actuating mechanism includes a hydraulically double-acting piston in a cylinder. The piston is detachably connected with a coupling rod whereby the coupling rod, in its turn, cooperates with the coupling member by way of a joint having three degrees of freedom. Additionally, the piston is guided with its sealing shank in the cylinder exclusively by way of sealing rings. The actuating mechanism is supplied from a hydraulic system separate from the internal combustion engine, which includes an accumulator containing the hydraulic medium under pressure, by way of lines in the engine housing cover.

35 Claims, 1 Drawing Sheet

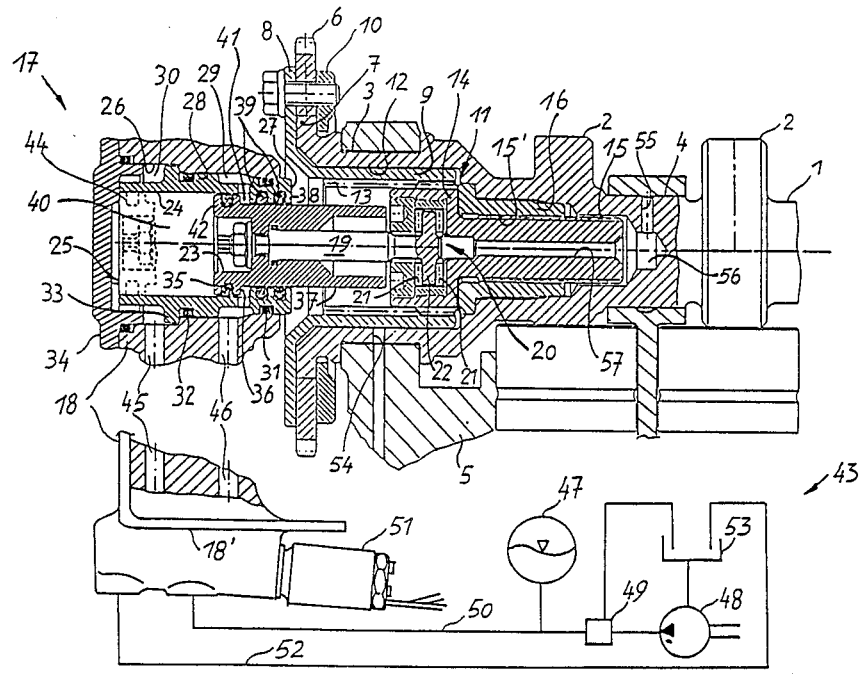

ARRANGEMENT FOR THE RELATIVE ANGULAR POSITION CHANGE OF TWO SHAFTS DRIVINGLY CONNECTED WITH EACH OTHER, ESPECIALLY BETWEEN A CRANKSHAFT SUPPORTED IN AN ENGINE HOUSING OF AN INTERNAL COMBUSTION ENGINE AND A CAM SHAFT

BACKGROUND OF THE INVENTION

The present invention relates to an arrangement for the relative angular position change of two drivingly connected shafts, especially between a crankshaft supported in an engine housing of an internal combustion engine and a cam shaft which includes an adjusting mechanism and an actuating mechanism as disclosed in the U.S. Pat. No. 3,258,937.

In this prior art arrangement, the driving gear is non-rotatably connected with a unilaterally axially extended hub, whereby the hub is rotatably supported near the driving gear in an engine housing. At its free end, it is rotatably supported by way of a cylindrical collar in an end-face aperture of a cam shaft for a fuel injection pump. The cam shaft is rotatably supported also in the engine housing near the coupling area with the hub. The cam shaft and the hub are provided with apertures, starting from the end faces on the coupling side, that include form-locking guidances for the coupling member. The coupling member which is axially adjustable relative to the driving gear, respectively, its hub for the angular position change, is acted upon on one side hydraulically for the adjustment and is supported on the other side by way of a return spring in the direction of the starting position. The hydraulic medium which is to be supplied for effecting an angular position change and for maintaining a predetermined angular position change, is supplied by way of channels within the area of the bearing of the hub to a control space which is axially limited on one side by an end face of the coupling member.

With the use of a return spring for the coupling member, only relatively low adjusting velocities can be attained. The magnitude of the prestress and the spring constant of the return spring are limited in their value because with increasing adjusting travel an equilibrium force has to be opposed on the hydraulic side to the spring force resulting therefrom. In the hydraulic medium which on its path from the pump driven by the internal combustion engine to the control space limited on one side by the coupling member, is conducted over a bearing gap of the slide bearing of the hub in the engine housing, an increased pressure has to be supplied by the pump with an increasing spring force which leads to an increasing medium loss through the slide bearing gap. A completely satisfactory angular position change of the cam shaft relative to its driving gear is thus no longer assured over the entire operating range of the internal combustion engine. Additionally, a curve of the pressure level in the control chamber to the coupling member will result from this sealing problem over the rotational speed range of the internal combustion engine which is not suited for a continuous Proportional adjustment of the coupling member. Of further disadvantage are the adjusting velocities of the coupling member differing in the two directions with the use of a return spring.

An arrangement for the relative angular position change of a cam shaft to the crankshaft of an internal combustion engine is disclosed in the EP-OS No. 163,046, in which an active hydraulic adjustment in opposite directions is possible. However, this arrangement, like the aforementioned arrangement according to the U.S. Pat. No. 3,258,937, discloses hydraulically adjustable elements arranged in rotating parts of the arrangement, connected with the problem of the feed of the hydraulic medium from fixed parts of the internal combustion engine into the rotating parts, respectively, arrangements of the mechanism for the relative angular position change.

This problem of the seal influences, inter alia, also the arrangement of such a mechanism for the relative angular position change in the engine housing of an internal combustion engine. With the aforementioned mechanisms, the leakage oil leaving through bearing gaps is fed within the engine housing to the respective collecting space. The pressure loss connected with the leakages out of the bearing gaps is thereby accepted.

However, such leakages, respectively pressure losses cannot be accepted or tolerated for a fine control of a hydraulically actuated mechanism for the relative angular position change. A mechanism, in which non-controllable leakages are avoided is disclosed in the U.S. Pat. No. 2,191,459. This mechanism, similar to the aforementioned mechanism according to the U.S. Pat. No. 3,258,937, discloses a coupling member form-lockingly connected, on the one hand, with the cam shaft and, on the other hand, with the hub of a driving gear whereby the coupling member is axially adjusted in one direction by a return spring and in the opposite direction hydraulically. In order to be able to permit in this mechanism to the pressure produced by a pump driven by the crankshaft to act on the piston of the coupling member without significant pressure loss owing to leakages, the rotating hub of the driving gear which is open end-face for the admission of the hydraulic medium to the piston, is sealed with respect to a coaxial bore in a housing wall. This arrangement is so made that in case of a leakage as a result of the defective seal, the hydraulic medium in the engine housing is conducted to the collecting space.

SUMMARY OF THE INVENTION

The present invention is concerned with the task to provide a mechanism of the aforementioned type for an active adjustment in opposite directions within a space-saving arrangement The underlying problems are solved according to the present invention in that the aperture of the shaft includes additionally a bearing bore for a hub of the driving gear, in that the hub is constructed of tubular-like shape and is provided along the inside thereof with helical, respectively, screw-type teeth which are operatively connected by way of the coupling member with the further guidance (straight teeth) arranged adjacent in the shaft, in that the coupling member is adapted to be coupled with the actuating mechanism arranged on a detachable engine housing cover, whereby a coupling rod of the actuating mechanism structurally separate from the adjusting mechanism is operatively connected with the coupling member by a joint having three degrees of freedom.

An arrangement is attained with the present invention in which the actuating mechanism is structurally separated from the adjusting mechanism on the shaft side whereby in case of a hydraulic actuating mechanism the latter can cooperate in an advantageous manner with a separate hydraulic system independent of the internal combustion engine. Furthermore, a relatively high pressure level can be chosen in an advantageous manner with a separate hydraulic system for the actuating mechanism, as a result of which relatively high adjusting velocities are attainable, and more particularly in both adjusting directions. In order to keep as small as possible eventual alignment errors between the adjusting mechanism and the actuating mechanism in their disadvantageous effects, the actuating mechanism is connected with the coupling member of the adjusting mechanism according to another feature of the present invention by way of a coupling rod which, in its turn, is operatively connected with the coupling member by way of a joint having three degrees of freedom. Mechanical stresses, which occur owing to eventual eccentricities between the rotating adjusting mechanism and the actuating mechanism non-rotatably secured at a detachable engine housing cover, can be avoided therewith. A space-saving construction is achieved in an advantageous manner by the hub of the driving gear arranged according to a further feature of the present invention in an end-face aperture of the shaft, especially of the cam shaft. As is known, especially cam shafts are supported at their ends adjacent the driving gear in the engine housing by way of a bearing relatively large in diameter so that an aperture arranged end-face within this area can be selected in its turn relatively large in diameter for receiving the hub of the driving gear. Owing to this construction, the adjusting mechanism can be arranged displaced essentially in the axial direction into the cam shaft so that no additional space, respectively, installation space is needed for the adjusting mechanism. This makes it additionally possible to move the fastening arrangement provided at the engine housing cover as near as possible to the free end of the cam shaft and thus to utilize the installation space between the driving gear at the free end of the cam shaft and the adjacent engine housing cover.

According to still further features of the present invention, the straight teeth on the side of the shaft are formed in a separate insert for reducing the manufacturing costs of the cam shaft whereby the insert will be non-rotatably arranged in an aperture constructed as stepped bore.

According to another feature of the present invention, the hub is adapted to be non-rotatably connected by way of a flange with a separate driving gear which is rotatably centered along the outer circumference of a shaft collar, and the hub and driving gear are axially secured by a respective end-face abutment of the flange and of an abutment ring opposite the same and coordinated to the driving gear at the shaft collar. With this arrangement and construction of the driving gear, an arrangement is obtained which can be constructed relatively short in the axial direction. Owing to the detachable connection of the driving gear with the flange of the hub, the driving gear can be adjusted correctly to the crankshaft of the internal combustion engine by circumferentially extending slots in the flange of the hub.

According to another feature of the present invention, the actuating mechanism includes a hydraulic double-acting cylinder/piston unit in which the cylinder is constructed open at its end opposite the adjusting mechanism for the arrangement of the piston which is detachably connected with the coupling rod pivotally connected at the coupling member and which abuts in its starting position effected by the helical, respectively, screw-type teeth with parts of its free end face at a separate closure lid covering the cylinder, which closure lid is adapted to be secured at the engine housing. The cylinder, according to still another feature of the present invention, is constructed separate and is adapted to be inserted into a stepped bore arranged in the engine housing cover and includes a forward outer circumferential section, as viewed in the insert direction, of relatively small diameter facing the adjusting mechanism and an axially spaced outer circumferential section of relatively large diameter located to the rear thereof which separates from one another two annular channels, while the cylinder, which is centered in the stepped bore by way of the outer circumferential sections and is sealingly arranged by means of elastic rings in circumferential grooves, includes an abutment collar coordinated to the rear outer circumferential section which together with the closure lid abutting at the cylinder axially fixes the cylinder. This permits a hydraulic actuating arrangement which is favorable as regards manufacture and assembly.

The exclusive guidance of the piston in the cylinder by way of elastic sealing rings according to still another feature of the present invention results in conjunction with the joint of the coupling rod having three degrees of freedom between the actuating mechanism and the adjusting mechanism in a further reduction of mechanical stresses stemming possibly from eccentricities of the adjusting mechanism.

According to still another feature of the present invention, an advantageous construction and arrangement of parts of the separate hydraulic system at the engine housing cover, as described more fully hereinafter, enables the attainment, on the one hand, of a space-saving arrangement with easy accessibility and, on the other hand, of a reduction of the number of individual parts having separate sealed connections.

According to another feature of the present invention, the joint includes axially spaced, radially directed slide or bearing devices within an end-face aperture of the coupling member between which is arranged a disk flange connected with the coupling rod. A joint can be attained therewith which can be subjected to high loads and advantageously can be constructed of short length and which includes radial needle bearings abutting on both sides of a disk flange arranged on the coupling rod. For purposes of lubricating this joint, the coupling member is equipped with a central lubricating bore which is in communication by way of a distribution chamber arranged within the area of a further slide bearing which is supplied with lubricating oil for the lubrication of this slide bearing.

The pressure reservoir mentioned hereinabove for a hydraulic system separate from the internal combustion engine may be a pressure accumulator used for the brake system with an internal combustion engine used in a passenger motor vehicle. Furthermore, a separate hydraulic pump is also within the scope of this invention for the supply with the hydraulic medium which, for example, may be a servo-steering pump. The structural expenditures for the mechanism for the change of the relative angular position can be kept low therewith. As to the rest, a separate hydraulic system with a reservoir or accumulator containing a hydraulic medium under pressure for the relative adjustment of the cam shaft to the crankshaft by changing the section length of an endless transmission means is disclosed in the DE-OS No. 19 16 167.

BRIEF DESCRIPTION OF THE DRAWING

These and other objects, features, and advantages of the present invention will become more apparent from the following description when taken in connection with the accompanying drawing which shows, for purposes of illustration only, one embodiment in accordance with the present invention, and wherein:

The single FIGURE is a partial cross-sectional view of an arrangement in accordance with the present invention.

DETAILED DESCRIPTION OF THE DRAWING

Referring now to the single FIGURE of the drawing, a cam shaft 1 with cams 2 for the actuation of gas-exchange valves (not shown) of an internal combustion engine is rotatably supported in a partially shown engine housing 5 of the internal combustion engine by way of slide bearings 3 and 4. A crankshaft is rotatably arranged in another part (not shown) of the engine housing 5 of the internal combustion engine, which is drivingly connected with a driving gear 6 of the cam shaft 1 by way of an endless driving means. The driving gear 6 is rotatably centered on a shaft collar 7 adjacent the slide bearing 3 of the cam shaft 1. The driving gear 6 which is angularly movably arranged relative to the cam shaft 1 is operatively connected with a hub 9 by way of a flange 8. The driving gear 6 is axially secured on the shaft collar 7 by way of the flange 8 on one side and by way of an abutment ring 10 on the other side.

The cam shaft 1 which is guided in its end area by way of the slide bearing 3 includes a concentric aperture generally designated by reference numeral 11 and is constructed as a stepped bore. The aperture 11 includes within the area of the slide bearing 3 a bearing bore 12 in which the hub 9 of the driving gear 6 is rotatably supported. The hub 9, which is non-rotatably connected with the driving gear 6, is constructed tubular-like and is provided along the inside with helical or screw-type teeth 13. A coupling member 14, which is in form-locking engagement with the spiral teeth 13 of the hub 9, is in form-locking engagement with the cam shaft 1 by way of straight-fluted teeth 15. The straight-fluted teeth 15′ on the side of the shaft is formed in an insert 16 which is arranged positionally fixed in a part smaller in diameter with respect to the bearing bore 12 and constructed as a collar sleeve.

The coupling member 14 which form-lockingly cooperates, on the one hand, with the helical, respectively, screw-type teeth 13 of the hub 9 of the driving gear 6 and, on the other hand, by way of the straight fluted teeth 15 with the cam shaft 1, serves for the transmission of the torque from the driving gear 6 to the cam shaft 1. The coupling member 14 which effects a non-rotatable connection between the driving gear 6 and the cam shaft 1, is axially displaceably arranged in the helical, respectively, screw-type teeth 13 and in the straight teeth 15, whereby the axial displacement of the coupling member 14 necessary for a relative angular position change of the driving gear 6 to the cam shaft 1 is effected by an actuating mechanism generally designated by reference numeral 17.

The actuating mechanism 17 is arranged in an engine housing cover 18 and includes a hydraulically double-acting cylinder/piston unit. The actuating mechanism 17, respectively, the cylinder/piston unit which is structurally separate from the adjusting mechanism including essentially the driving gear 6 and the coupling member 14, is constructed to be adapted to be coupled with the coupling member 14. A coupling rod 19 serves for that purpose which is operatively connected with the coupling member 14 by way of a joint generally designated by reference numeral 20 having three degrees of freedom. The joint 20 includes axially spaced needle bearings 21 within an end-face recess of the coupling member 14, between which is arranged a disk flange 22 connected with the coupling rod 19. Axial deviations between the coupling member 14 rotating together with the cam shaft 1 and the actuating mechanism 17 arranged at the engine housing cover 18 can be compensated therewith.

The coupling rod 19 arranged at the coupling member 14 is adapted to be coupled with a piston 23 of the actuating mechanism 17 by way of a detachable connection. For the accessibility of the detachable connection between the coupling rod 19 and the piston 23, the actuating mechanism 17 includes a cylinder 24 which is constructed open at its end 25 opposite the adjusting mechanism for the arrangement of the piston 23. The cylinder 24 is constructed separately and is adapted to be inserted into a stepped bore 26 arranged in the engine housing cover 18. It includes a forward outer circumferential section 27, as viewed in the insert direction, facing the adjusting mechanism which is of relatively small diameter, and an axially spaced outer circumferential section 28 located to the rear with respect thereto of relatively large diameter whereby the outer circumferential section 28 separates two annular channels 29 and 30 from one another. Furthermore, the cylinder 24 which is centered in the stepped bore 26 by way of the outer circumferential sections 27 and 28 and which is sealingly arranged by means of elastic rings 31 and 32 in circumferential grooves, includes an abutment collar 33 coordinated to the rear outer circumferential section 28. The cylinder 24 is axially fixed in the stepped bore 26 of the engine housing cover 18 by way of this abutment collar 33, on the one hand, and a closure lid 34 abutting end-face at the cylinder 24 at its open end 25, on the other. The closure lid 34 is adapted to be secured at the engine housing cover 18.

The piston 23 is guided in the cylinder 24 exclusively by way of an elastic sealing ring 35. At its end-face 36 facing the adjusting arrangement the piston 23 further includes a sealing shank 37 of relatively large diameter. The sealing shank 37 extends through a radially inwardly directed collar 38 at the cylinder 24 within the area of the forward outer circumferential section 27 with relatively large play. Elastic sealing rings 39 in axially spaced circumferential grooves within the collar 38 serve for the guidance of the sealing shank 37. Owing to the exclusive guidance of the piston 23 and of its sealing shank 37 by way of the elastic seals 35 and 39, loads and stresses at the joint 20 which stem from possible alignment defects, are reduced. Furthermore, a body sound bridge between the cam shaft 1, respectively, its adjusting mechanism and the actuating mechanism 17 arranged at the engine housing cover 18 is avoided with this type of construction.

The piston 23 divides the interior space of the cylinder 24 into a first control chamber 40 and into a second control chamber 41. The first control chamber 40 is delimited in the axial direction, on the one hand, by the closure lid 34 and, on the other hand, by the free end-face 42 of the piston 23. In contrast, the control chamber 41 is delimited in the axial direction by the relatively narrow end face at the collar 38 of the cylinder 24 and the end face 36 of the piston 23. The piston 23 is thus constructed as a differential piston, with the advantage that the hydraulic medium having a relatively high pressure from a hydraulic system 43 separate from the internal combustion engine can abut in the control chamber with the smaller effective areas. The pressure effective in the control chamber 41 serves for the displacement of the piston 23 into its starting position 44 indicated in dash lines. This means for the coupling member 14 coupled with the piston 23 a starting position provided in the left part of the hub 9 which means for the cam shaft 1 an adjustment toward "delayed", respectively, a retarded angular position In order to assure a completely satisfactory operation of the cam shaft 1 with a missing medium pressure in the control chambers 40, 41, the spiral, respectively, screw teeth 13 are so selected in their pitch that the driving gear 6 overtakes the cam shaft 1 in the driving, respectively, rotating direction until the piston 23 displaced by the coupling member 14 abuts in its starting position 44 at the closure lid 34.

The control chambers 40 and 41 are in medium-conducting communication with the annular channels 29 and 30 arranged concentrically to the cylinder 24, whereby the annular channels 29 and 30 are each connected with a separately constructed line 45 and 46 in the engine housing cover 18. Both lines 45 and 46 are connected with the hydraulic system generally designated by reference numeral 43 which includes a reservoir or accumulator 47 containing the hydraulic medium under pressure. The pressure reservoir 47 which is operatively connected with a pump 48 driven by the internal combustion engine and a pressure-regulating valve 49, acts by way of a line 50 on the lines 45 and 46. The two lines 45 and 46 on the side of the engine are controllable by means of a valve mechanism 51. The valve mechanism 51 can be controlled according to a performance characteristic or curve of the internal combustion engine for an operating-point-dependent adjustment of the cam shaft. A return line to a tank 53 in the hydraulic system 43 is designated in the drawing by reference numeral 52.

A hydraulic medium supplied by way of the line 45 to the control space 40 effects an adjustment of the piston 23 and therewith of the coupling member 14 which is limited in its axial displacement by abutting at stops (not shown) of the cylinder 24. Such a displacement of the coupling member 14 in the direction of the insert 16 brings about a forward adjustment, respectively, an adjustment for "advance" of the cam shaft 1 relative to the driving gear 6.

With a view toward good accessibility for the servicing, the valve arrangement 51 is constructed as a structurally separate functional unit which is adapted to be arranged at a side wall 18' of the engine housing cover 18 essentially parallel to the longitudinal direction of the internal combustion engine and toward the driving end thereof.

The internal combustion engine includes for the cam shaft 1 a lubricating system separate from the hydraulic system 43 which includes a lubricating bore 54 arranged radially in the slide bearing 3 which leads to the bearing bore 12 in the aperture 11 receiving the hub 9 of the driving gear 6. A lubricating oil bore 55 arranged radially in the slide bearing 4 and leading to a distribution chamber 56 formed in the end area of the aperture 11 in the cam shaft 1 further belongs to the lubricating system of the internal combustion engine. The lubricating oil is supplied from the distribution chamber 56 both to the straight teeth 15 of the coupling member 14 and also by way of a central bore 57 in the coupling member 14 to the joint 20.

In the arrangement according to the present invention, no seals 35, 39 loaded by rotation are provided at the piston 23 and sealing shank 37 in the actuating arrangement 17. In addition to the increased safety against leakages obtainable therewith, it is additionally achieved with the arrangement of the present invention in the case of an eventual leakage that in case of defective seals 35, 39, the hydraulic medium leaves into the interior of the internal combustion engine and thus a loss is avoided which would adversely affect the environment. This is of considerable significance in view of the actuating mechanism 17 adapted to be acted upon with relatively high pressures of a separate hydraulic system, whereby as regards the fluctuating driving torque of the rotating cam shaft 1 a favorable ratio of adjusting moment to aforementioned driving torque is achieved for a stable relative positioning of the cam shaft 1 and of the driving gear 6.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An arrangement for the relative angular position change of two shafts drivingly connected with each other, comprising adjusting means and actuating means, the adjusting means including a movably arranged coupling member effecting a non-rotatable connection by way of form-locking guide means of one of said shafts and a coordinated driving gear, said coupling member being in operative form-locking engagement for an angular position change by axial displacement of said guide means, the coupling member being operatively connected on its shaft side with one of said guide means arranged in a guided end area of the shaft within an aperture means, the aperture means of said shaft including additionally a bearing bore for a hub of the driving gear, the hub being of tubular-like shape and being provided along the inside with said one of said guide means, which are operatively connected with another guide means arranged adjacent in said one shaft by way of the coupling member, said coupling member being operable to be coupled with the actuating means which is structurally separate from the adjusting means and includes a coupling rod operatively connected with the coupling member by way of a joint means having three degrees of freedom, wherein said driving gear surrounds the hub and is disposed at a position spaced axially from the joint means towards the end of said cam shaft.

2. An arrangement according to claim 1, wherein said shafts include a crankshaft rotatably supported in an engine housing of an internal combustion engine and a cam shaft.

3. An arrangement according to claim 1, wherein said form locking guide means include non-rectilinear teeth means, and wherein said non-rectilinear teeth means are spiral or screw-type teeth and said one guide means includes rectilinear teeth.

4. An arrangement according to claim 1, wherein said form-locking guide means include inclined teeth means and straight teeth means.

5. An arrangement according to claim 1, wherein said form-locking guide means comprise inclined teeth means including one of spiral or screw-type teeth.

6. An arrangement according to claim 1, wherein the aperture means is a stepped bore which receives in a part smaller in diameter compared to the bearing bore a positionally fixedly arranged insert means constructed as a collar sleeve and having straight teeth means as one of said guide means.

7. An arrangement according to claim 6, wherein the form-locking guide means comprises inclined teeth means, and
wherein the hub is operable to be non-rotatably connected by way of a flange with a separate driving gear, the driving gear being rotatably connected along the outer circumference of a shaft collar and the hub and driving gear being axially secured at the shaft collar by an end-face abutment of the flange and of an abutment ring coordinated to the driving gear and opposite the flange.

8. An arrangement according to claim 7, wherein the actuating means is arranged at a detachable engine housing cover, and
wherein the actuating means includes a hydraulically double acting cylinder/piston unit in which the cylinder is constructed open at its end opposite the adjusting means for the arrangement of the piston which is detachably connected with the coupling rod pivotally connected at the coupling member and which in its starting position effected by the inclined teeth means abuts with parts of its free end-face at a separate closure lid covering the cylinder, and said closure lid being adapted to be secured at the engine housing cover.

9. An arrangement according to claim 8, wherein the cylinder is constructed separate and is adapted to be inserted into a stepped bore arranged in the engine housing cover, the cylinder including a forward outer circumferential section, as viewed in the insert direction, facing the adjusting means which is of relatively small diameter and an axially spaced outer circumferential section to the rear thereof of relatively large diameter which separates from one another two annular channels, the cylinder being centered in the stepped bore by way of the outer circumferential sections, said cylinder being sealingly arranged by means of elastic rings in circumferential grooves and including an abutment collar coordinated to the rear outer circumferential section, and said abutment collar axially fixing the cylinder together with the closure lid abutting at the end-face at the cylinder.

10. An arrangement according to claim 9, wherein the piston is guided in the cylinder by way of an elastic sealing ring, the piston additionally including at its end-face facing the adjusting means a sealing shank of relatively large diameter which is guided by way of elastic sealing rings arranged within the area of the forward outer circumferential section in axially spaced circumferential grooves of a radially inwardly directed collar at the cylinder.

11. An arrangement according to claim 10, further comprising annular channels in communication with control chambers formed on both sides of the piston in the cylinder and in communication with separately constructed lines in the engine housing cover, both lines being operatively connected with a hydraulic system separate from the internal combustion engine and including a reservoir containing a hydraulic medium under pressure, the lines to the control chambers being controllable by means of a valve means 12. An arrangement according to claim 11, wherein the valve means is a structurally separate unit which is adapted to be arranged at a side wall of the engine housing cover.

13. An arrangement according to claim 11, wherein the joint means includes within an end-face aperture of the coupling member axially spaced, radially directed bearing means, between which is arranged a disk flange connected with the coupling rod.

14. An arrangement according to claim 13, wherein the bearing means are needle bearings.

15. An arrangement according to claim 13, wherein the one shaft includes a slide bearing adjacent said one shaft collar, a radial lubricating oil bore leading from the slide bearing to the bearing bore in the aperture means receiving the hub of the driving gear, a further slide bearing between adjacent cams of said one shaft, a further radial lubricating oil bore leading to a distribution chamber arranged in the end area of the aperture means, lubricating oil being supplied from the distribution chamber to the guide means on the shaft side of the coupling member as also by way of a central bore in the coupling member to the joint means.

16. An arrangement according to claim 1, wherein the hub is operable to be non-rotatably connected by way of a flange with a separate driving gear, the driving gear being rotatably centered along the outer circumference of a shaft collar and the hub and driving gear being axially secured at the shaft collar by an end-face abutment of the flange and of an abutment ring coordinated to the driving gear and opposite the flange.

17. An arrangement according to claim 4, wherein the actuating means is arranged at a detachable engine housing cover, and
wherein the actuating means includes a hydraulically double-acting cylinder/piston unit in which the cylinder is constructed open at its end opposite the adjusting means for the arrangement of the piston which is detachably connected with the coupling rod pivotally connected at the coupling member and which in its starting position effected by the inclined teeth means abuts with parts of its free end-face at a separate closure lid covering the cylinder, and said closure lid being adapted to be secured at the engine housing cover.

18. An arrangement according to claim 17, wherein the cylinder is constructed separate and is adapted to be inserted into a stepped bore arranged in the engine housing cover, the cylinder including a forward outer circumferential section, as viewed in the insert direction, facing the adjusting means which is of relatively small diameter and an axially spaced outer circumferential section to the rear thereof of relatively large diameter which separates from one another two annular channels, the cylinder being centered in the stepped bore by way of the outer circumferential sections, said cylinder being sealingly arranged by means of elastic rings in circumferential grooves and including an abutment collar coordinated to the rear outer circumferential section, and said abutment collar axially fixing the cylinder together with the closure lid abutting at the endface at the cylinder.

19. An arrangement according to claim 18, wherein the piston is guided in the cylinder by way of an elastic sealing ring, the piston additionally including at its endface facing the adjusting means a sealing shank of relatively large diameter which is guided by way of elastic sealing rings arranged within the area of the forward outer circumferential section in axially spaced circumferential grooves of a radially inwardly directed collar at the cylinder.

20. An arrangement according to claim 17, further comprising annular channels in communication with control chambers formed on both sides of the piston in the cylinder and in communication with separately constructed lines in the engine housing cover, both lines being operatively connected with a hydraulic system separate from the internal combustion engine and including a reservoir containing a hydraulic medium under pressure, the lines to the control chambers being controllable by means of a valve means.

21. An arrangement according to claim 20, wherein the valve means is a structurally separate unit which is adapted to be arranged at a side wall of the engine housing cover.

22. An arrangement according to claim 1, wherein the joint means includes within an end-face aperture of the coupling member axially spaced, radially directed bearing means, between which is arranged a disk flange connected with the coupling rod.

23. An arrangement according to claim 22, wherein the bearing means are needle bearings.

24. An arrangement according to claim 16, wherein the one shaft includes a slide bearing adjacent said one shaft collar, a radial lubricating oil bore leading from the slide bearing to the bearing bore in the aperture means receiving the hub of the driving gear, a further slide bearing between adjacent cams of said one shaft, a further radial lubricating oil bore leading to a distribution chamber arranged in the end area of the aperture means, lubricating oil being supplied from the distribution chamber to the guide means on the shaft side of the coupling member as also by way of a central bore in the coupling member to the joint means.

25. An arrangement according to claim 1, wherein said actuating means are arranged at a detachable engine housing cover.

26. An arrangement according to claim 1, wherein said form-locking guide means includes non-rectilinear teeth means.

27. An arrangement according to claim 25, wherein said form-locking guide means includes non-rectilinear teeth means.

28. An arrangement according to claim 1, wherein the recess is a step bore with a bearing bore receiving the hub, and a bore that in comparison has a smaller diameter for receiving an insert that is developed as a flange bushing, is fixed in its position and has straight teeth as the axial guide at the shaft for the coupling member that is provided with straight teeth.

29. An arrangement according to claim 28, wherein the hub has helical or screw-type teeth as the guide means for the coupling member with a slope that is directed in the same direction as the rotating or driving direction of the driving gear, said hub and said driving gear, being axially secured with play at the shaft collar of the shaft via a flange in a torsionally fixed way by means of one respective front-face contact of the flange and a stop ring assigned to the driving gear and facing away from said flange.

30. An arrangement according to claims 1, wherein the joint means is disposed in a front-face recess of the coupling member and comprises axially spaced, radially directed sliding or rolling devices, between which a disk flange is arranged that is connected with the coupling rod.

31. An arrangement according to claim 30, wherein the actuating arrangement actuates the coupling rod via a piston that can be shifted by means of medium pressure, and the connection of the coupling rod and the piston can be established via the free end of the actuating arrangement,
and wherein the actuating arrangement is a hydraulically double-acting cylinder/piston unit having a cylinder that is developed to be open at its end that faces away from the adjusting arrangement or the arrangement of the piston that strikes with parts of its free-front face against a separate closing lid covering the cylinder in its initial position, said closing lid being fixable at the machine housing cover.

32. An arrangement for the relative angular position change of two shaft drivingly connected with each other, especially of a crankshaft supported in an engine housing of an internal combustion engine and a cam shaft, the cam shaft including a driving gear engine which is angularly movably arranged relative top the cam shaft by way of an axially displaceable coupling member, comprising an actuating means for the axial displacement of the coupling member for an angular position change of the cam shaft relative to the driving gear and therewith to the crankshaft, a detachable engine housing cover means, said actuating means being structurally from the cam shaft at said detachable engine housing cover means, the actuating means including a hydraulically double-acting piston in a cylinder, the piston being detachably connected with a coupling rod, and the coupling rod, in its turn, cooperating with the coupling member by way of a joint means having three degrees of freedom,
wherein said joint means is disposed in a concentric recess formed in a machine guided end of said cam shaft, said driving gear being disposed surrounding said recess at a position disposed spaced from the joint means towards the end of said cam shaft and having a hub which includes teeth means engageable with corresponding teeth means of the coupling member for accommodating said angular position change.

33. An arrangement according to claim 32, wherein the piston is guided with its sealing shank in the cylinder exclusively by way of sealing rings.

34. An arrangement according to claim 32, wherein the actuating means is supplied from a hydraulic system separate from the internal combustion engine, which includes an accumulator containing hydraulic medium under pressure, by way of lines in the engine housing cover means.

35. An arrangement for the relative angular position change of two shaft drivingly connected with each other, especially of a crankshaft supported in an engine housing of an internal combustion engine and a cam shaft, the cam shaft including a driving gear which is angularly movably arranged relative to the cam shaft by way of an axially displaceable coupling member, comprising an actuating means for the axial displacement of the coupling member for an angular position change of the cam shaft relative to the driving gear and therewith to the crankshaft, said actuating means being structurally separate from the cam shaft and the actuating means including a hydraulically double-acting piston in a cylinder, the piston being detachably connected with a coupling rod, and the coupling rod, in its turn, cooperating with the coupling member by way of a joint means having three degrees of freedom, wherein said joint means is disposed in a concentric recess formed in a machine guided end of said cam shaft, said driving gear being disposed surrounding said recess at a position disposed spaced from the joint means towards the end of said cam shaft and having a hub which includes teeth means engageable with corresponding teeth means of the coupling member for accommodating said angular position change.

* * * * *